April 5, 1927.

W. P. BOVARD 1,623,654

APPARATUS USED IN BONDING RAILS AND METHOD OF ITS APPLICATION

Filed Oct. 7, 1918

Witness
S. S. Mathis

Inventor
William P. Bovard.

By
Gaaaaad
Attorney

Patented Apr. 5, 1927.

1,623,654

UNITED STATES PATENT OFFICE.

WILLIAM P. BOVARD, OF MANSFIELD, OHIO, ASSIGNOR TO THE OHIO BRASS COMPANY, OF MANSFIELD, OHIO, A CORPORATION OF NEW JERSEY.

APPARATUS USED IN BONDING RAILS AND METHOD OF ITS APPLICATION.

Application filed October 7, 1918. Serial No. 257,305.

This invention relates to apparatus used in the bonding of electric rails and the method of its application.

One object of my present invention is to provide a device for use in the application of rail bonds by means of which the bond can be conveniently held in proper position upon the rail.

Another object of my invention is to provide a device which is suitable for the bonding of rails where an intensely high and concentrated heating flame is used such as the electric arc or the oxyacetylene flame or other gaseous flame, and to provide protection for that part of the bond which rests below the end of the terminal of the bond and which may be called the body or conducting part of the bond proper.

Another object of my invention is to provide a device which will stabilize the air currents around the region where the high temperature flame is operating and this is of special importance where the electric arc is used.

Still another object of my invention is to provide a device which will tend to maintain a low temperature on the terminal proper, thereby permitting a quick solidification or setting of the attaching metal during the application of the bond.

A still further object of my invention is to provide a device in which the terminals of a bond may be held in proper relation to the adjacent end of rails where the rails are not in perfect alinement.

A still further object of my invention is to provide a device which is simple in construction and easily and quickly attached to and detached from the rail.

Other objects will be obvious from the annexed drawings and indicated in connection therewith by the following analysis of this invention.

This invention accordingly consists in the features of construction, combination of parts and in the unique relation of the members and disposition thereof and the application of this invention in connection with the bonding of rails, all as more completely outlined herein.

To enable others skilled in the art to comprehend the underlying features of my invention that they may embody the same by the numerous modifications in structure and relation contemplated by this invention, drawings depicting a preferred form have been annexed as a part of this disclosure, and in such drawings like character of reference denote corresponding parts throughout all the views, in which—

Figure 1:
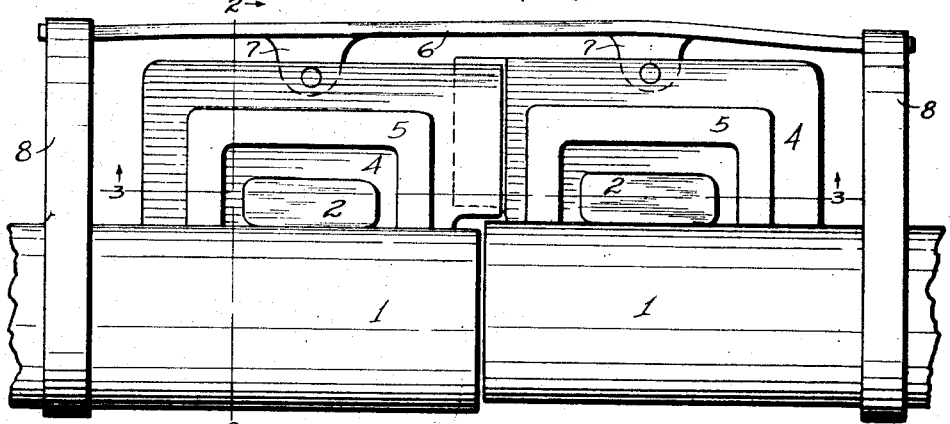
Figure 1 is a top plan view of my device positioned at the adjacent ends of two conductor rails and securely holding thereto a rail bond adapted to be attached to the rail by welding.
Figure 2:
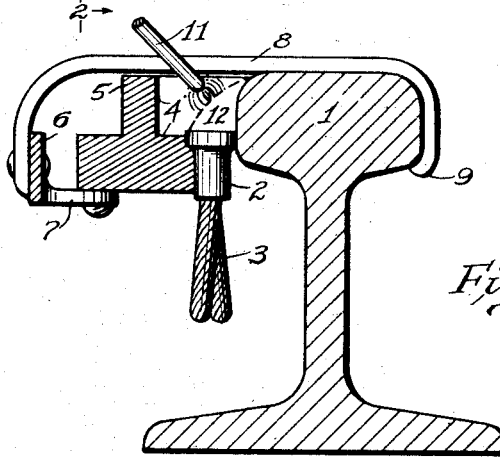
Figure 2 shows an end view in elevation and section taken on the line 2—2 of Figure 1.
Figure 3:
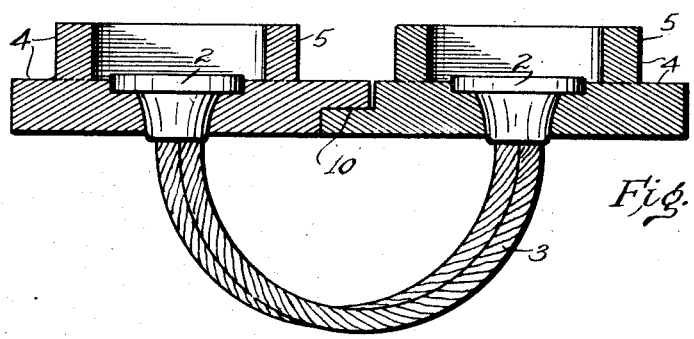
Figure 3 shows sectional view of the holding members of my device in connection with a rail bond and is taken on the line 3—3 of Fig. 1.

The use of the electric arc and high temperature gaseous flame for the application of rail bonds to electric conductor rails is a matter which is being given a great deal of attention at the present time by both manufacturers and users of electric rail bonds and particularly is this so in connection with bonds adapted to be applied by the electric arc for the reason that bonds so applied form practically an integral part of the rail and, therefore, producing a high efficiency joint and also for the fact that the electric current used in applying is conveniently available from the trolley line overhead and is practically so at all times and at a very low cost.

It has been found, however, that up to the present time there are certain defects in the present methods of using the electric arc and other high temperature flame and these defects are quite annoying and detract, from many standpoints, from the success of bonds thus applied.

I have found, however, that I have been able to overcome many of the present objections to this method of bonding by the proper construction of a device for holding the bond in position upon the rail during the application of the bond.

I have observed in installing rail bonds by means of the electric arc in particular that the arc has a tendency to "roam"; that is, it does not hold itself steady at one particular point until the application of welding metal to that point has been concluded, but it may switch to another point without warning and thereby cause a loss of time in the installation of the bond, annoyance to the workman and inefficiency as to the results of the installation.

I have also discovered that this "roaming" action of the arc is due to air currents flowing upward and also to the action of the wind sideways upon the electric arc. Therefore, I have seen fit to construct my device in such a manner as to protect the arc from these atmospheric variations.

I have also observed when using the electric arc as a heating means that there is a tendency for the welding metal used in attaching the terminal of the bond to the rail, to run off of the terminal while in a molten condition due to the fact that the terminal must be very hot in order to properly unite with the welding metal and the welding metal being in a molten condition, the tendency of the electric arc is to blow the welding metal from the bond terminal. The behavior of the electric arc is different from that of a gaseous flame; that is, one produced by the oxyacetylene method, for the reason that in the case of the gas flame the flame is steady and can be applied at any point for any length of time and in any direction, and hence the control of the molten metal is very much more easily taken care of than with the electric arc.

I have found, however, that by surrounding the terminal of the bond with a quite heavy and massive plate of metal that this acts as a chill during the operation of applying the terminal of the bond to the rail by conducting the heat away from the terminal rapidly and prevents the welding metal from readily flowing off of the terminal; that is the terminal is chilled sufficiently to cause the molten attaching metal to set quickly when the arc is removed from the point of application. I have found that if this somewhat large and massive block is made of copper, which is one of the best metallic conductors of heat known, that the best results are then secured although other metals may be used in the block for this chilling action.

I have also observed that in the use of high temperature flames for the application of rail bonds that there is a tendency for the outer envelope of the flame to spread considerably and this is thrown downward and at times is very liable to reach the more delicate and susceptible-to-injury part of the bond known as the conducting cable. It is advisable to protect this body or conducting cable as thoroughly as possible from the intensity of the flame and by constructing the holding or chilling part of my apparatus as I do and as shown, the flame is prevented from contacting with the conducting portion of the bond. I have found that to secure this protection, however, it is not necessary to make the holding part of my apparatus of copper, iron or other metal, but any material which will resist a high temperature flame such as carbon, vitreous materials, formed-up asbestos compounds, etc., will meet this requirement.

That member of my device, which acts as a chill also acts as a shield from changing atmospheric conditions and shield to the body cable, I call a chill-shield which is indicative or descriptive of the function performed by this member.

In some processes of bonding where the electric arc is used, the end of the conducting cable or bond body is inserted through an opening in the bottom of a carbon mold and projects into a cavity in the mold adjacent the rail. In such methods the cavity in the mold acts as a receptacle for the molten attaching metal. In my apparatus and the method of its use I have no mold; hence there is no cavity in which the welding metal is deposited and I have found that such methods have their disadvantages in that the operator is not able to observe the operation of his flame and the quality of his work on account of the mold obstructing his view of the work. In my apparatus the space around the terminal in which the flame operates is made as large as desired within reason and the operator at all times has a clear and unobstructed view of his work which is very important.

I have also observed that most devices used for clamping bonds to a rail are more or less rigid, especially in regard to that portion of the clamp which directly contacts with the terminals and this part is usually constructed of one piece and, therefore, any lateral inequalities in the position of the two rails to be bonded will cause the holding device to be improperly positioned. I therefore have devised a construction in which the part gripping the two terminals of the bond is divided and move relatively to each other with an overlapping joint which makes the device practically adjustable to uneven rail conditions and giving each terminal the proper hold to its respective rail.

Referring to the drawings in detail, the adjacent ends of the conductor rail to be bonded are indicated by the numeral 1 and it will be observed that these rail ends are slightly offset laterally, which is not uncommon in railroad construction work, to better show my device operating under such conditions. The terminals of a bond adapted for application to the rail are indicated by numeral 2. The body or conducting portion of the bond is indicated by 3. The gripping or holding member of my device and that part which also acts as a "chill" and also prevents the variation in air currents and which I term a chill-shield, is indicated by 4. The chill-shield block 4 is then provided with an upright projecting member 5 which eliminates side drafts of air from affecting the arc and adds to the mass and chilling capacity of the chill-shield may form a separately or integral part of the chill-shield and may be made of the same material as the balance of the chill-shield. 6 represents a cross bar member to which are secured lugs 7 and to these lugs 7 are secured the chill-shields 4 and usually the two are secured together by a pivot joint as shown, which allows freedom and independence of action of the chill-shield 4 with respect to each other and to the rail. It is usual to make the bar 6 of a resilient material in which case with proper length of the hook members 8 the chill-shield 4 will be held against the terminal 2 and the rail end 1 by a constant pressure yieldable in either direction toward or away from the rail. The hook member 8 is provided with a short bend at its end indicated by 9 which slightly underlaps the rail and tends to prevent the hook member 8 from slipping away from the rail. The chill-shields 4 are provided with a sliding lap joint 10 which permits relative motion of the chill-shields in practically any direction and without allowing any opening therebetween through which the heating flame may escape and reach the bond body 3. It also permits bringing the terminals of the bond very much closer together which is important as this tends to cut down the length of the bond. 11 represents an electrode which is attached to one pole of a source of electric power which may be a motor generator set operated from the trolley wire, a generator operated by a source of power other than electric, or it may be attached directly to the trolley through proper channels for controlling the amount of current. The rail 1 is usually connected to the other pole of the source of power. The numeral 12 indicates the welding metal which has been built up on the end of the bond terminal 2 and in contact with the face of the rail 1.

The apparatus above described is simple, reliable and efficient under all conditions and is believed to accomplish among others all of the objects and advantages set forth above.

The application to and method of removal of my device from a rail is very simple and clearly shown in the drawing. The bond terminals are first positioned in the orifices or slots in the chill-shield blocks 4 which are properly shaped to fit the terminals and while held therein the opposite faces of the terminals are placed in position against the rail and the hook portions 8 and 9 are then caused to pass over and downward on the opposite side of the rail head and into position.

The bond and holding device having been properly positioned and the electrode 11 and rail 1 having been properly connected to the source of electric power, the operator takes the electrode 11 and contacts its end with the rail or bond terminal, thereby drawing an arc when the electrode is moved away slightly. This arc is then concentrated on a certain point of the terminal and rail until a sufficient degree of heat is reached to melt a rod of attaching metal which flows and unites with the bond and the rail at the point heated. In this case it is assumed that the electrode 11 is of carbon but if the electrode 11 is made of the same material as used in attaching the bond to the rail, then as the heat becomes sufficiently great the end of the electrode 11 will melt and attach the terminal 2 to the rail 1. The welding operation is usually commenced at the corner of the angle formed by the bond terminal with the rail and as this is filled the arc is gradually worked outward and the intervening space filled with welding metal until the arc reaches the outer edge of the bond terminal and as soon as the metal is melted at the outer edge of the terminal the arc is drawn away and if the terminal does not cool quickly upon the removal of the arc then the metal at the outer edge of the terminal will overflow and run from the terminal and it is this overflowing and "running away" of the molten metal that the chilling member 4 overcomes in rapidly conducting away the heat so as to allow the molten attaching metal to quickly chill or set. During this operation the arc has been protected from upward or sidewise drafts of air and the operator is able to hold the arc steady at any one point of operation desired. Also the flame of the arc surrounding the arc proper is prevented from being driven downward against the delicate members 3 of the bond body and injuring them.

Without further analysis, the foregoing will so fully reveal the gist of this invention that others can, by applying current knowledge, readily adapt it for various applications without omitting certain features that, from the standpoint of the prior art, fairly constitute essential characteristics of the generic or specific aspect of this invention, and therefore such adaptations should and are intended to be comprehended within the meaning and range of equivalency of the following claims.

Having thus described my invention, what I claim as new and desire to secure by Letters Patent is:—

1. A device used in securing rails bonds to rails comprising in combination a bar, means secured to the bar to engage a rail and support the device, a plurality of chill-shield members as described secured to the bar by a flexible joint to allow independence of movement of each chill-shield member and the chill-shields provided with overlapping joints at their adjacent ends and each chill-shield provided with means for receiving the terminal of a rail bond.

2. An article of manufacture comprising a body member and metallic means secured thereto to chill the terminal members of a bond and protect the arc used in securing the terminal to a rail from changes in atmospheric conditions.

3. A device used in welding rail bonds to rails comprising in combination a resilient bar, means for securing the device in working position and a plurality of chill-shield members independently secured to the resilient bar to engage the bond and hold the bond in position while welding.

4. A device used in welding rail bonds to rails comprising in combination, a pair of independent holding members each to engage a rail bond terminal and resilient means to cooperate with the holding members and the rail to hold the holding members independent of each other in engagement with the bond terminals.

5. A device used in welding rail bonds to rails comprising in combination, a resilient bar, means to secure the bar to a rail and a plurality of independently operating members secured to the bar and movable by the bar to engage the bond terminals and hold them in position on the rail.

6. A rail bonding device comprising in combination, a plurality of holding members each to engage a rail bond terminal and movable independently of each other, and means to move the holding members independently of each other into yielding engagement with the bond terminals and support the holding members relative to a rail.

7. A device used in welding rail bonds to rails comprising pivotally mounted means to engage and support the rail bond terminals, means to secure the device to a rail and resilient means to yieldingly hold the said pivotally mounted means in engagement with the said terminals.

8. A device used in welding rail bonds to rails comprising a plurality of independent and pivotally mounted means to engage and support the rail bond terminals, means to secure the device to a rail and resilient means to yieldingly hold the said pivotally mounted means in engagement with the said terminals.

9. A device used in welding rail bonds to rails comprising in combination, a bar, separate means each pivotally secured to the resilient member and moving independently of each other in a lateral direction to the rail to engage the terminals of a rail bond and means securing the above named parts in position on the rail.

10. A device used in welding rail bonds to rails comprising in combination a bar, means to hold the device in working position on the rails and means pivotally secured to the bar to engage and chill the bond terminals.

11. A support for a rail bond terminal comprising a single block of copper having extended, exposed areas to radiate heat and a recess in one face to receive the bond terminal and hold the terminal adjacent the rail to which the bond is to be welded by fused metal, the mass and exposed area of the copper block being sufficient to conduct the heat from the rail and bond terminal sufficiently rapid to chill or set the fused welding metal as applied to the bond terminal and rail to permit building the fused metal upon the terminal and against the rail without the use of a confining wall for the fused metal, and means to hold the copper block in position relative to the rail.

12. A support for a rail bond terminal comprising a metallic block having a recess in one edge to removably engage the bond terminal and hold the terminal adjacent the rail to which it is to be welded by fused metal, all surfaces of the block being exposed to the atmosphere except the one adjacent the rail and bond terminal and the upper face of the block being adjacent the upper face of the bond terminal, the mass and exposed area of the block being such as to conduct and radiate the heat from the bond terminal sufficiently rapid to chill or set the fused welding metal as applied to the bond terminal and rail to permit building the fused metal upon the terminal and against the rail face without the aid of a confining wall for the fused metal, and means to hold the block in position relative to the rail.

13. The method of attaching rail bonds to rails comprising positioning the bond terminals on the faces of adjacent ends of abutting rails, then applying a metallic electrode to the bond terminal and to the adjacent rail surface to heat the same and simultaneously fuse the electrode and deposit the fused electrode upon the heated surfaces of the bond terminal and rail, also simultaneously and rapidly conducting the heat from the terminal to permit building the fused electrode thereon and against the rail surface without the aid of retaining walls for the fused metal and prevent the fused metal from flowing off the terminal.

14. The method of securing rail bonds to rails comprising supporting the bond terminal in a closely fitting metallic member to rapidly conduct and radiate heat and adjusting the terminal adjacent the rail with the face of the bond terminal exposed, then applying a metallic electric arc to the terminal and rail to heat the same and applying molten metal to the parts to secure the terminal to the rail without the use of retaining walls to maintain the molten metal upon the said parts.

In testimony whereof I affix my signature.

WILLIAM P. BOVARD.